(12) United States Patent  
Masuda et al.

(10) Patent No.: US 9,482,587 B2
(45) Date of Patent: Nov. 1, 2016

(54) MAGNETIC LOAD SENSOR UNIT

(75) Inventors: Yui Masuda, Iwata (JP); Makoto Yasui, Iwata (JP); Toru Takahashi, Iwata (JP)

(73) Assignee: NTN CORPORATION, Osaka (JP)

( * ) Notice: Subject to any disclaimer, the term of this patent is extended or adjusted under 35 U.S.C. 154(b) by 283 days.

(21) Appl. No.: 14/235,818

(22) PCT Filed: Jul. 27, 2012

(86) PCT No.: PCT/JP2012/069192
§ 371 (c)(1),
(2), (4) Date: Jan. 29, 2014

(87) PCT Pub. No.: WO2013/018715
PCT Pub. Date: Feb. 7, 2013

(65) Prior Publication Data
US 2014/0224038 A1 Aug. 14, 2014

(30) Foreign Application Priority Data
Aug. 2, 2011 (JP) .................................. 2011-169160

(51) Int. Cl.
*G01L 1/22* (2006.01)
*G01L 1/00* (2006.01)
*G01L 5/00* (2006.01)
*G01L 5/04* (2006.01)
*G01L 1/26* (2006.01)
(Continued)

(52) U.S. Cl.
CPC ................. *G01L 1/12* (2013.01); *G01L 1/122* (2013.01); *F16D 2066/005* (2013.01)

(58) Field of Classification Search
None
See application file for complete search history.

(56) References Cited

U.S. PATENT DOCUMENTS

| | | | |
|---|---|---|---|
| 6,005,199 A | 12/1999 | Harada et al. | |
| 6,123,183 A * | 9/2000 | Ito | B60K 23/08 192/220 |
| 2004/0187591 A1 | 9/2004 | Baumann et al. | |

(Continued)

FOREIGN PATENT DOCUMENTS

| | | |
|---|---|---|
| EP | 2 738 532 | 6/2014 |
| JP | 58-201041 | 11/1983 |

(Continued)

OTHER PUBLICATIONS

European Office Action issued Nov. 9, 2015 in corresponding European Application No. 12 819 872.8.

(Continued)

*Primary Examiner* — Michael A Lyons
*Assistant Examiner* — Jermaine Jenkins
(74) *Attorney, Agent, or Firm* — Wenderoth, Lind & Ponack, L.L.P.

(57) ABSTRACT

A magnetic load sensor unit is provided which can detect a load with a minute movement of its part, and which is durable and less likely to be influenced by temperature. The sensor unit includes a flange member (1) deflectable when an axial load is applied, a support member (2) supporting the flange member (1), a magnetic target (3) which generates a magnetic field, and a magnetic sensor (4) for detecting the magnetic field generated by the magnetic target (3). The magnetic target (3) and the magnetic sensor (4) are fixed to the flange member (1) and the support member (2), respectively, such that when the flange member (1) is deflected, the magnetic target (3) and the magnetic sensor (4) move relative to each other, whereby magnitude of the load can be detected based on the magnetic field detected by the magnetic sensor (4).

18 Claims, 13 Drawing Sheets

(51) Int. Cl.
*G01L 1/12* (2006.01)
*F16D 66/00* (2006.01)

(56) References Cited

U.S. PATENT DOCUMENTS

| | | | | |
|---|---|---|---|---|
| 2007/0164626 | A1* | 7/2007 | Taniguchi | F04D 29/05 310/90.5 |
| 2010/0071453 | A1* | 3/2010 | Isono | G01L 5/161 73/146 |
| 2011/0077595 | A1* | 3/2011 | Eich | A61M 5/31501 604/135 |
| 2012/0227513 | A1 | 9/2012 | Sato | |
| 2014/0191627 | A1 | 7/2014 | Takahashi et al. | |

FOREIGN PATENT DOCUMENTS

| | | |
|---|---|---|
| JP | 60-177232 | 9/1985 |
| JP | 62-038328 | 2/1987 |
| JP | 07-318441 | 12/1995 |
| JP | 11-132874 | 5/1999 |
| JP | 2004-301835 | 10/2004 |
| JP | 2005-221418 | 8/2005 |
| JP | 2010-210461 | 9/2010 |
| JP | 2011-112511 | 6/2011 |
| WO | 2011/030839 | 3/2011 |

OTHER PUBLICATIONS

Japanese Office Action issued Jan. 13, 2015 in corresponding Japanese Application No. 2001-169160 (with English translation).
International Search Report issued Sep. 25, 2012 in International (PCT) Application No. PCT/JP2012/069192.
Written Opinion of the International Searching Authority issued Sep. 25, 2012 in International (PCT) Application No. PCT/JP2012/069192 (with English translation).

* cited by examiner

MAGNETIC LOAD SENSOR UNIT

TECHNICAL FIELD

This invention relates to a magnetic load sensor unit.

BACKGROUND ART

Typically, electric brake systems include a mechanism for converting the rotary motion of an electric motor to a linear motion of a friction pad to press the friction pad against the brake disk, thereby generating a braking force. In order to control the braking force to a desired magnitude, a load sensor unit is mounted in many of such electric brake systems at a portion where a reaction force of the load applied to the friction pad is received. For improved responsiveness of braking, it is preferable to use a load sensor unit which can detect a load applied when its moving part or parts move a shortest possible distance.

A load sensor unit which can detect loads with a minimum displacement of its moving parts is disclosed e.g. in the below-identified Patent document 1. This load sensor unit includes an opposed pair of annular presser plates, piezoelectric crystal elements disposed between the presser plates, an insulating plate electrically insulating the piezoelectric crystal elements from one of the opposed pair of presser plates, and a lead wire through which voltage generated by the piezoelectric crystal elements are taken out.

When an axial load is applied to this load sensor unit, the piezoelectric crystal elements generate a voltage corresponding to the load applied. It is thus possible to detect the load applied by measuring the voltage generated. Since the presser plates are moved very little relative to each other due to deformation of the piezoelectric crystal elements, this sensor unit will never deteriorate responsiveness of braking if this sensor unit is mounted in an electric brake system.

But since this load sensor is designed such that loads act on the piezoelectric crystal elements too, if an impulsive load or a load oblique to the axial direction is applied to the piezoelectric crystal elements. one or more of the piezoelectric crystal elements may crack or chip. Also, since loads act on the insulating plate electrically insulating the piezoelectric elements and one of the presser plates too, high durability is required for the insulating plate. It is therefore difficult to use an inexpensive insulating material such as resin for the insulating plate because such an inexpensive insulating material is insufficient in durability.

A load sensor unit which can detect loads with a minimum displacement of its moving parts is also disclosed in the below-identified Patent document 2. The load sensor unit disclosed in Patent document 2 includes a cylindrical member made of a metal, and a strain gauge stuck on the radially outer surface of the cylindrical member. When an axial load is applied to this load sensor unit, strain is generated in the cylindrical metal member corresponding to the axial load applied. By measuring the magnitude of the strain generated, it is possible to detect the magnitude of the load applied.

This load sensor unit has a problem in that since the strain gauge measures not the degree of deformation itself of the cylindrical metal member but local strain of the cylindrical member, a change in temperature and the temperature distribution, of the cylindrical member tend to influence the detection result, and thus could result in errors in detection.

PRIOR ART DOCUMENTS

Patent Documents

Patent document 1: International Application Publication 2011/030839
Patent document 2: JP Patent Publication 7-318441A

SUMMARY OF THE INVENTION

Object of the Invention

An object of the present invention is to provide a load sensor unit of the type which can detect loads with a minimum displacement of its moving part, and which is durable and is less likely to be influenced by the temperature conditions.

Means for Achieving the Object

In order to achieve this object, the present invention provides a magnetic load sensor unit comprising a flange member configured to be deflected when an axial load is applied, a support member supporting the flange member, at least one magnetic target which generates a magnetic field, and at least one magnetic sensor for detecting a magnetic field generated by the magnetic target, wherein one and the other of the magnetic target and the magnetic sensor are fixed to the flange member and the support member, respectively, such that when the flange member is deflected, the magnetic target and the magnetic sensor move relative to each other, whereby the magnitude of the load applied is detectable based on the magnetic field as detected by the magnetic sensor.

When an axial load is applied to the flange member of this magnetic load sensor unit, the flange member is deflected, so that the magnetic target and the magnetic sensor move relative each other. This changes the output signal of the magnetic sensor. Thus, it is possible to detect the magnitude of the load based on the output signal of the magnetic sensor. When an axial load is applied to the sensor unit, the axial load acts on the flange member, deflecting the flange member, but does not act on the magnetic sensor. Thus, the sensor is less likely to malfunction even if an impulsive load or a load oblique to the direction is applied. This arrangement thus ensures high durability of the magnetic sensor. Since the magnetic sensor detects the axial load based not on local strain but the degree of deformation, of a member which receives the load, the reading of the magnetic sensor is less likely to be influenced by a change in temperature and temperature distribution.

Preferably, the magnetic target comprises at least two permanent magnets each magnetized in a direction perpendicular to a relative movement direction in which the magnetic target and the magnetic sensor move relative to each other, the permanent magnets are arranged such that opposite magnetic poles of the permanent magnets are aligned in the relative movement direction, and the magnetic sensor is located in the vicinity of the boundary between the opposite magnetic poles.

With this arrangement, the output signal of the magnetic sensor changes steeply and suddenly when the magnetic target and the magnetic sensor move in the axial direction relative to each other, while the output signal of the magnetic sensor scarcely changes when the magnetic target and the magnetic sensor move in a direction other than the axial direction, relative to each other. Thus, the output signal of the magnetic sensor is less likely to be influenced by external vibrations, so that it is possible to stably and accurately detect the magnitude of the axial load.

Preferably, the flange member and the support member are annular plate members facing each other, the support member supports the radially outer portion of the flange member, one of the flange member and the support member includes a tubular portion having a radially outer surface facing the radially inner surface of the other of the flange member and the support member, and the magnetic target and the magnetic sensor are fixed to one and the other of the radially inner surface and the radially outer surface, respectively. With this arrangement, the radial relative position between the magnetic target and the magnetic sensor can be easily and accurately determined.

In this arrangement, the support member may be provided with an annular protrusion at the radially inner portion of the surface of the support member opposite from its surface facing the flange member. With this arrangement, when an axial load is applied to the flange member, not only the flange member but also the support member is deflected. Since the magnetic target and the magnetic sensor are moved relative to each other due to deflection of both members, the load applied can be detected with high resolution.

In an alternative arrangement, the flange member and the support member are annular plate members facing each other, the support member supports the radially inner portion of the flange member, one of the flange member and the support member includes a tubular portion having a radially inner surface facing a radially outer surface of the other of the flange member and the support member, and the magnetic target and the magnetic sensor are fixed to one and the other of the radially inner surface and the radially outer surface, respectively. With this arrangement too, the radial relative position between the magnetic target and the magnetic sensor can be easily and accurately determined.

In this arrangement, the support member may be provided with an annular protrusion at the radially outer portion of the surface of the support member opposite from its surface facing the flange member. With this arrangement, when an axial load is applied to the flange member, not only the flange member but also the support member is deflected. Since the magnetic target and the magnetic sensor are moved relative to each other due to deflection of both members, the load applied can be detected with high resolution.

The magnetic load sensor unit may further include a positioning means for fixing the circumferential relative position between the flange member and the support member. With this arrangement, it is possible to easily and accurately determine the circumferential relative position between the magnetic target and the magnetic sensor.

The flange member may have a spherical surface having a center located on the center axis of the flange member, with the magnetic load sensor unit configured such that an axial load acts on the spherical surface. With this arrangement, if a load oblique to the axial direction is applied, such a load acts on the flange member at a point closer to the center axis of the flange member, which allows the flange member to be deflected more uniformly, and thus stabilizes detection accuracy.

The at least one magnetic target and at least one magnetic sensor may comprise a plurality of sets of magnetic targets and magnetic sensors, and the respective sets lie on a common circle having a center on the center axis of the flange member so as to be circumferentially equidistantly spaced apart from each other. With this arrangement, if a load oblique to the axial direction is applied, it is possible to estimate the angle of the load applied relative to the axial direction based on the difference between the output signals of the respective load sensors.

The magnetic sensor may be a magnetic resistance element or a magnetic impedance element. But a Hall IC is preferably used because it is less expensive and is superior in heat resistance. The permanent magnets are preferably neodymium magnets, because neodymium magnets can generate strong magnetic fields while taking up little space.

The flange member and the support member are preferably made of a common material or materials equal in thermal expansion coefficient. With this arrangement, when the temperature rises, the flange member and the support member are thermally expanded at the same rate, so that the magnetic target and the magnetic sensor are less likely to axially move relative to each other due to a change in temperature. This effectively minimizes the temperature influence.

Advantages of the Invention

Since the magnetic load sensor unit according to this invention is configured such that when a load is applied to the flange member, the load is not applied to the magnetic sensor with only the flange member deflected by the load. This sensor unit shows high durability even if impulsive loads or loads oblique to the axial direction are applied to the sensor unit. Also, since this sensor unit detects an axial load not based on local strain of the member to which the axial load is applied but based on the amount of deformation of this member, the sensor unit is less likely to be influenced by a change in temperature or a variation in temperature distribution.

MODE FOR EMBODYING THE INVENTION

Figure 1:
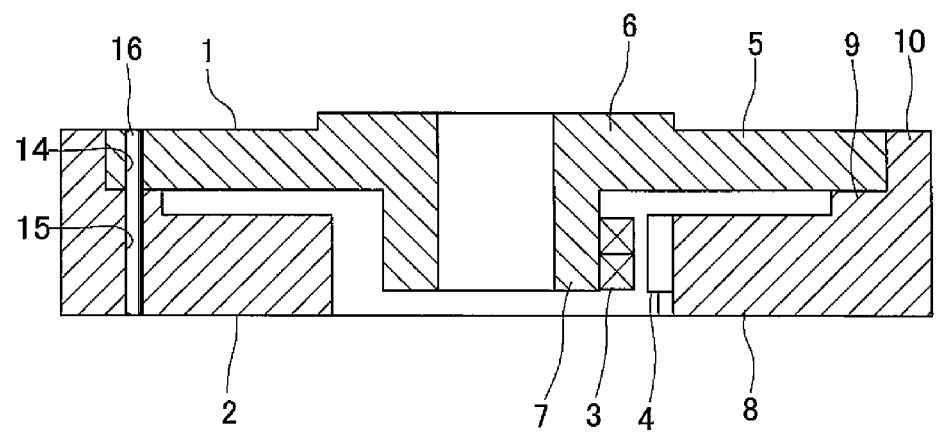
FIG. 1 is a sectional view of a magnetic load sensor unit according to a first embodiment of the present invention.
Figure 2:
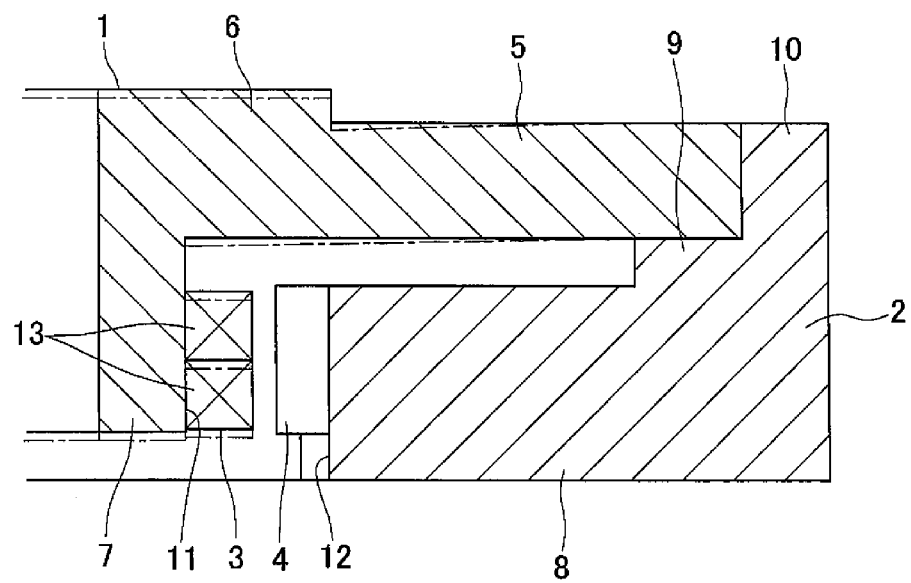
FIG. 2 is an enlarged sectional view of the magnetic load sensor unit shown in FIG. 1.
Figure 3:
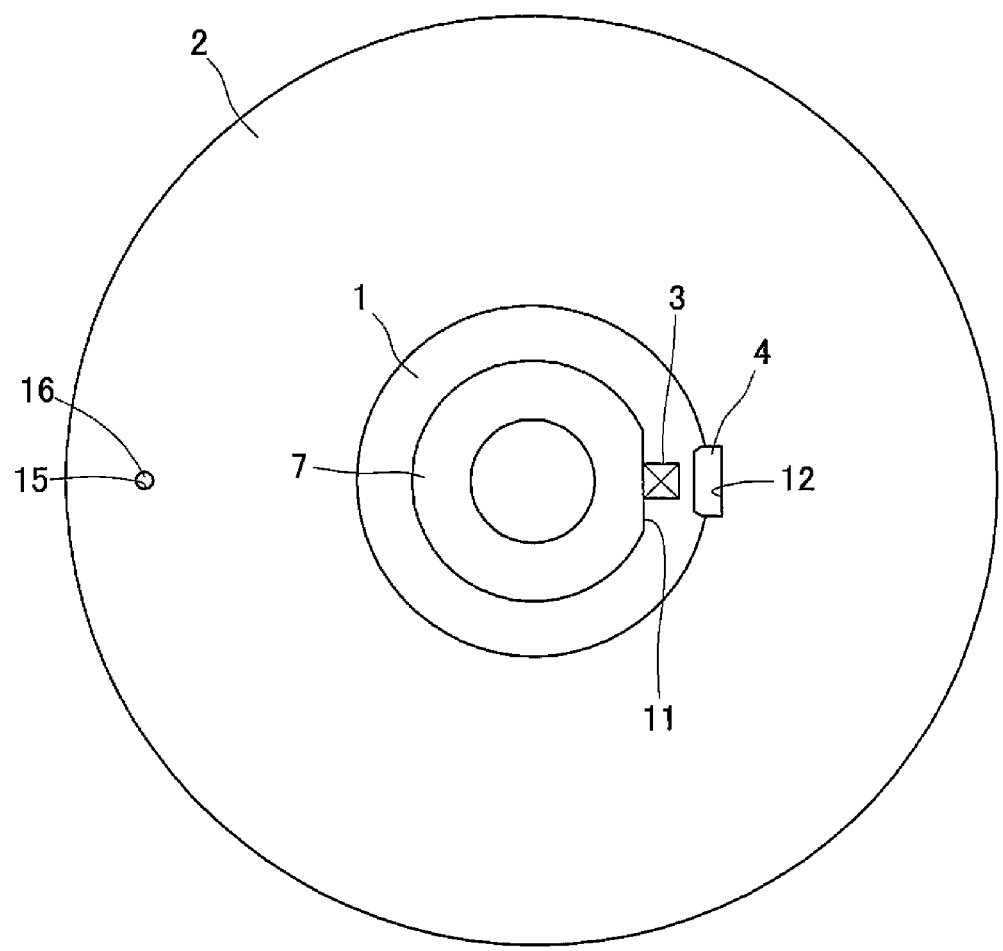
FIG. 3 is a bottom plan view of the magnetic load sensor unit shown in FIG. 1.

FIGS. 1 to 3 show a magnetic load sensor unit of a first embodiment of the present invention. This magnetic load sensor unit includes a flange member 1 in the form of an annular plate member, and a support member 2 axially facing the flange member 1, a magnetic target 3 which generates a magnetic field, and a magnetic sensor 4 which detects the magnitude of the magnetic target 3.

The flange member 1 includes an annular plate portion 5 facing the support member 2, an annular load-bearing portion 6 protruding from the radially inner portion of the surface of the annular plate portion 5 opposite from the surface of the annular plate portion 5 facing the support member 2, and a tubular portion 7 formed on the radially inner portion of the surface of the annular plate portion 5 facing the support member 2.

The support member 2 includes an annular plate portion 8 facing the flange member 1, an annular support step portion 9 protruding from the radially outer portion of the surface of the annular plate portion 8 facing the flange member 1, and a tubular fitting portion 10 formed on the radially outer portion of the annular support step 9. The support step portion 9 supports the radially outer portion of the flange member 1, thereby maintaining a predetermined distance between the annular plate portions 5 and 8. The flange member 1 is fixed in position by being fitted in the fitting portion 10 of the support member 2. The flange member 1 may be fixed in position by fitting the flange member 1 in the fitting portion 10 with an interference fit or by plastically deforming and wedging the outer edge of the flange member 1 into the inner wall of the fitting portion 10 (crimping).

A pin hole 14 extends axially through the flange member 1 at its radially outer portion. Another axial pin hole 15 is formed in the support member 2. The pin hole 14 of the flange member 1 and the pin hole 15 of the support member 2 are arranged such that when the pin holes 14 and 15 are axially aligned with each other, the circumferential position of the magnetic target 3 coincides with the circumferential position of the magnetic sensor 4. By inserting the positioning pin 16 through the pin holes 14 and 15, the relative circumferential position between the flange member 1 and the support member 2 is fixed in this position.

The tubular portion 7 has a radially outer surface radially facing the radially inner surface of the support member 2. As shown in FIG. 3, the radially outer surface of the tubular portion 7 has a chamfered portion 11 to which the magnetic target 3 is fixed. The magnetic sensor 4 is fixed in a groove 12 formed in the radially inner surface of the support member 2. The flange member 1 and the support member 2 are made of the same metal (such as iron or an aluminum alloy) so that the flange member 1 and the support member 2 have the same linear expansion coefficient.

The magnetic target 3 comprises two permanent magnets 13 each magnetized in the radial direction such that each magnet has magnetic poles at the radially inner and outer ends, respectively. The two permanent magnets 13 are arranged adjacent to each other such that two poles opposite in polarity (i.e. N- and S-poles) of the respective magnets are aligned in the axial direction.

If neodymium magnets are used as the permanent magnets 13, the magnets 13 can generate strong magnetic fields while taking up little space. But as the permanent magnets 13, samarium-cobalt magnets, Alnico magnets, or ferrite magnets may be used instead. If samarium-cobalt magnets or Alnico magnets are used as the permanent magnets 13, the magnetic fields generated from the permanent magnets are less likely to decrease with a temperature rise of the permanent magnets 13. As the permanent magnets 13, praseodymium magnets or samarium-iron-nitride magnets may also be used.

As shown in FIG. 3, the magnetic sensor 4 is arranged to face the magnetic target 3 in a direction perpendicular to the axial direction (radial direction in the FIG. 3), in the vicinity of the boundary between the adjacent magnetic poles of the two respective permanent magnets 13. As the magnetic sensor 4, a magnetoresistance element (or MR sensor) or a magneto-impedance element (or MI sensor) may be used. But a Hall IC is preferably used, because a Hall IC is less expensive and also heat-resistant.

When an axial load is applied to the load-bearing portion 6 of the flange member 1 of this magnetic load sensor unit, the annular plate portion 5 of the flange member 1 is deflected in the axial direction about the radially outer portion of the annular plate portion 5 (as shown by chain line in FIG. 2). The deflection of the annular plate portion 5 changes the relative position between the magnetic target 3 and the magnetic sensor 4, which in turn changes the output signal of the magnetic sensor 4. Thus, by grasping the relationship between the magnitude of the axial load applied to the flange member 1 and the output signal of the magnetic sensor 4 beforehand, it is possible to detect the magnitude of the axial load applied to the flange member 1 based on the output signal of the magnetic sensor 4.

The axial load applied to the magnetic load sensor unit acts on the flange member 1, deflecting the flange member 1, but does not act on the magnetic sensor 4. Thus, even if an impulsive load is applied or a load is applied in a direction oblique to the axial direction, the magnetic sensor 4 is less likely to malfunction and thus maintains high durability.

The magnetic load sensor unit detects the axial load not based on local strain of the flange member 1 but based on the amount of deformation of the flange member 1. The axial load thus detected is therefore less likely to be influenced by a change in temperature or a variation in temperature distribution, of the flange member 1, so that it is possible to detect the magnitude of the axial load with high accuracy.

Figure 4:
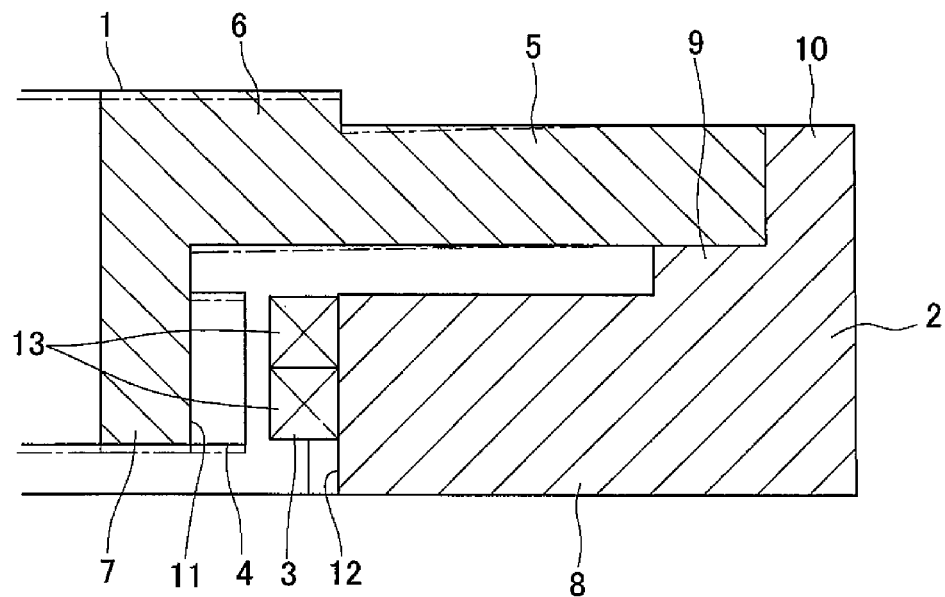
FIG. 4 is an enlarged sectional view of a magnetic target and a magnetic sensor of FIG. 2, in which they are arranged in a different manner from the arrangement of FIG. 2.

In the embodiment of FIGS. 1 to 3, the magnetic target 3 is fixed to the flange member 1, while the magnetic sensor 4 is fixed to the support member 2. But the magnetic target 3 and the magnetic sensor 4 may be arranged conversely. In particular, as shown in FIG. 4, the magnetic sensor 4 may be fixed to the radially outer surface of the tubular portion 7 of the flange member 1, while the magnetic target 3 may be fixed to the radially inner surface of the support member 2.

When an axial load is applied to the flange member 1, mainly shear loads act on the flange member 1, while mainly compressive loads act on the support member 2. The magnetic target 3 is displaced by the shear loads that act on the flange member 1, while the magnetic sensor 4 scarcely moves under the compressive loads that act on the support member 2. This makes it possible to detect the axial load based on the relative displacement between the magnetic target 3 and the magnetic sensor 4.

When an axial load is applied to the flange member 1, the distance by which the relative position between the magnetic target 3 and the magnetic sensor 4 changes is extremely small. For example, if an axial load of 30 kN is applied to the flange member 1, the relative position between the magnetic target 3 and the magnetic sensor 4 changes only about 0.1 mm in the axial direction. But in this magnetic load sensor unit, since the plurality of permanent magnets 13 are arranged such that their opposite magnetic poles are aligned in the direction in which the relative position between the magnetic target 3 and the magnetic sensor 4 changes, and further the magnetic sensor 4 is positioned adjacent to the boundary between the adjacent opposite magnetic poles, the output signal of the magnetic sensor 4 changes sharply and steeply when the relative position between the magnetic target 3 and the magnetic sensor 4 changes. This makes it possible to detect the distance by which the relative position between the magnetic target 3 and the magnet sensor 4 changes with high accuracy.

If a gap sensor which detects a change in reluctance of a single coil is used instead of the magnetic target 3 and the magnetic sensor 4, due to its insufficient resolution, this sensor cannot detect the degree of deflection of the flange member 1 with high accuracy. It is therefore conceivable to use, instead of the above-described flange member 1, a less rigid member (i.e. a member which can be deformed to a greater degree under the same load, such as a coil spring). But if such a sensor unit is mounted in an electric brake system, the response of the brake system tends to deteriorate. To avoid this problem, a complicated mechanism for increasing displacement is necessary. Such a mechanism could cause hysteresis errors and pushes up the manufacturing cost. In contrast, since the magnetic load sensor unit according to the present invention is designed such that the output signal of the magnetic sensor 4 changes sharply and steeply when the relative position between the magnetic target 3 and the magnetic sensor 4 changes, it is possible to detect the distance by which the relative position between the magnetic target 3 and the magnetic sensor 4 changes with high accuracy.

With this magnetic load sensor unit, the magnetic target 3 is fixed to the tubular portion 7 of the flange member 1, which faces the radially inner surface of the support member 2, while the magnetic sensor 4 is fixed to the radially inner surface of the flange member 1. This makes it possible to easily and accurately maintain the radial relative position between the magnetic target 3 and the magnetic sensor 4.

With this magnetic load sensor unit, since the circumferential relative position between the flange member 1 and the support member 2 is fixed by the positioning pin 16, the circumferential relative position between the magnetic target 3 and the magnetic sensor 4 can also be easily and accurately maintained.

With this magnetic load sensor unit, since the flange member 1 and the support member 2 are made of the same material or materials having the same linear expansion coefficient, when the temperature rises, the flange member 1 and the support member 2 are thermally expanded at the same rate, so that the magnetic target 3 and the magnetic sensor 4 are less likely to axially move relative to each other due to a change in temperature. This improves stability and accuracy of detection.

If a capacitance sensor is used instead of the magnetic target 3 and the magnetic sensor 4, a complicated damp-proof structure is necessary in order to cope with high-temperature or low-temperature conditions, which also pushes up the manufacturing cost. This sensor also requires a complicated insulation structure and a sensor driving circuit, or a low-pass filter having a low cutoff frequency, in order to remove electrical noise. Such additional components further push up the manufacturing cost. In contrast, the magnetic load sensor unit needs neither a complicated damp-proof structure nor a complicated insulation structure for removing electrical noise.

If a laser displacement sensor is used instead of the magnetic target 3 and the magnetic sensor 4, a complicated seal structure is necessary for oil and fats. Also, locations where such a sensor can be installed are limited. The magnetic load sensor unit according to the present invention needs no seal structure for oil and fats.

The output of the magnetic sensor 4 may be in the form of a voltage output, any other analogue output such as a current output, or a digital output based on a predetermined protocol such as a PWM duty ratio or serial-parallel communication.

Figure 5:
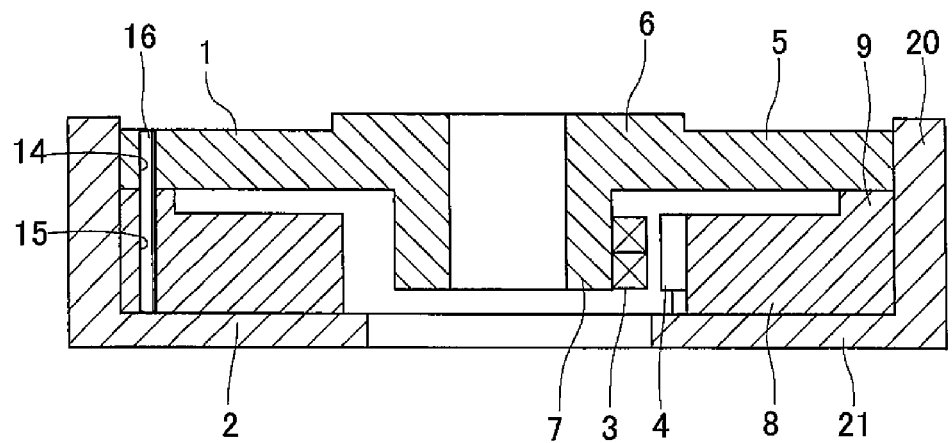
FIG. 5 is a sectional view of a magnetic load sensor unit according to a second embodiment of the present invention.

FIG. 5 shows a magnetic load sensor unit according to a second embodiment of the present invention. Elements of this embodiment corresponding to those of the first embodiment are denoted by identical numerals and their description is omitted.

The flange member 1 and the support member 2 are fitted in a cylindrical housing 20. The housing 20 has a bottom plate 21 at one end thereof. The bottom plate 21 supports the surface of the support member 2 on the opposite side from the flange member 1. The annular plate portion 5 of the flange member 1 has its outer edge crimped to apply a preload to the flange member 1 and also to prevent the flange member 1 from being pulled out of the housing 20. By applying an axial preload to the flange member 1 in the above manner, it is possible to stably detect an applied load even if the load is near zero.

Figure 6:
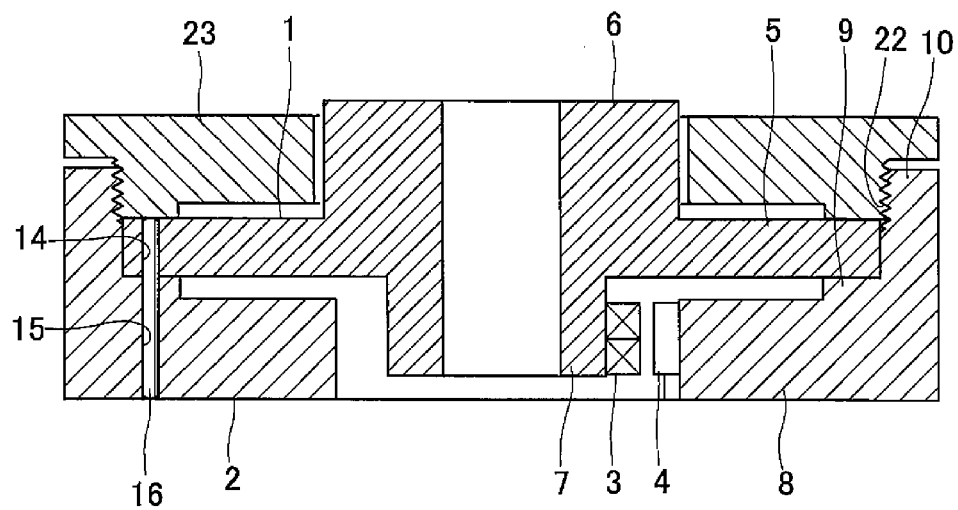
FIG. 6 is a sectional view of a magnetic load sensor unit according to a third embodiment of the present invention.

FIG. 6 shows a magnetic load sensor unit according to a third embodiment of the present invention, in which the support member 2 includes an annular plate portion 8 facing the flange member 1, an annular support step portion 9 protruding from the radially outer portion of the surface of the annular plate portion 8 facing the flange member 1, and a tubular fitting portion 10 provided on the radially outer side of the support step portion 9. An internal thread 22 is formed on the inner wall of the tubular fitting portion 10. An externally threaded member 23 is in threaded engagement with the internal thread 22. The externally threaded member 23 is a ring-shaped member through which the load-bearing portion 6 of the flange member 1 extends. The externally threaded member 23 is axially pressed against, and applies an axial preload to, the radially outer portion of the flange member 1. By applying an axial preload to the flange member 1 in this manner, it is possible to stably detect a load applied even if the load is near zero.

Figure 7:
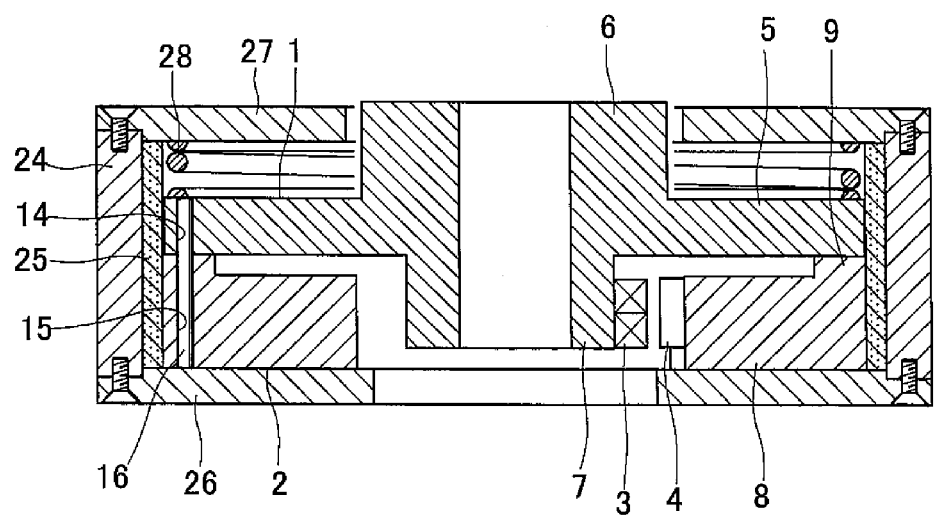
FIG. 7 is a sectional view of a magnetic load sensor unit according to a fourth embodiment of the present invention.

FIG. 7 shows a magnetic load sensor unit according to a fourth embodiment of the present invention, in which the flange member 1 and the support member 2 are received in a cylindrical housing 24. This sensor unit further includes a slide bearing 25 impregnated with lubricant and inserted in the housing 24. The flange member 1 and the support member 2 are axially slidably received in the slide bearing 25. A bottom plate 26 is screwed to the bottom end of the housing 24, and supports the surface of the support member 2 opposite from the surface of the support member 2 facing the flange member 1. A lid plate 27 is screwed to the top end of the housing 24. A preloading spring 28 is mounted between the lid plate 27 and the flange member 1 in an axially compressed state. The preloading spring 28 presses the radially outer portion of the flange member 1 against the support step portion 9, thereby fixing the flange member 1 in position. Instead of the slide bearing 25, a linear ball guide (not shown) including balls for guiding may be used. In this embodiment too, since an axial preload is applied to the flange member 1, it is possible to stably detect a load applied even if the load is near zero.

Figure 8:
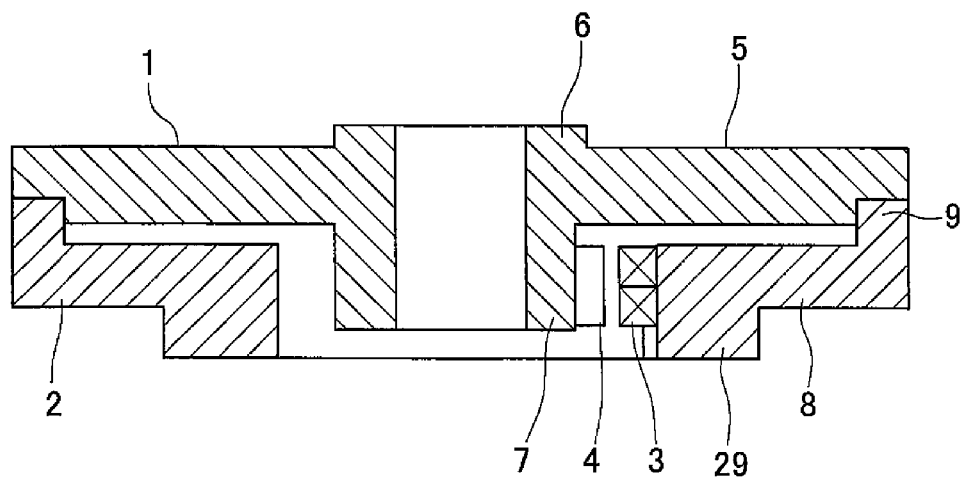
FIG. 8 is a sectional view of a magnetic load sensor unit according to a fifth embodiment of the present invention.

FIG. 8 shows a magnetic load sensor unit according to a fifth embodiment of the present invention, in which the support member 2 has an annular protrusion 29 on the surface of the support member 2 opposite from the surface of the support member 2 facing the flange member 1. The support member 2 is supported at the annular protrusion 29. With this arrangement, when an axial load is applied to the flange member 1, not only the flange member 1 but also the support member is deflected. Since the magnetic target 3 and the magnetic sensor 4 are moved relative to each other due to deflection of both members 1 and 2, the load applied can be detected with high resolution.

Figure 9:
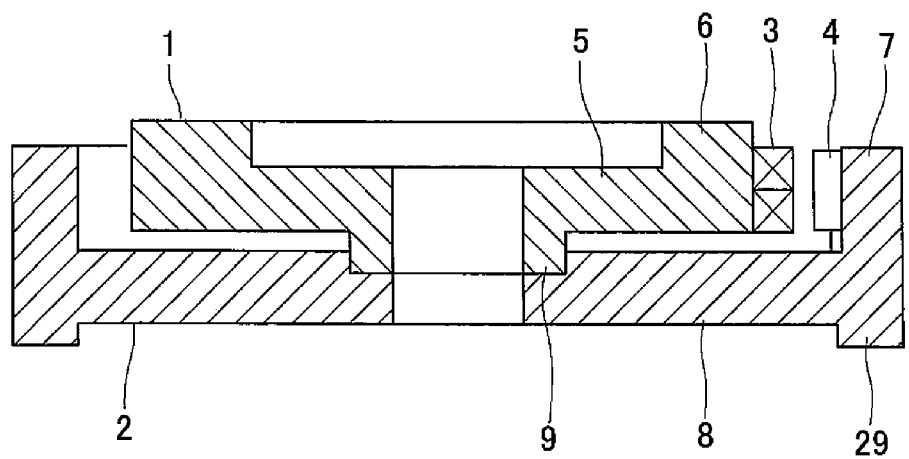
FIG. 9 is a sectional view of a magnetic load sensor unit according to a sixth embodiment of the present invention.

FIG. 9 shows a magnetic load sensor unit according to a sixth embodiment of the present invention, which differs from the fifth embodiment in that the portions of the magnetic target and the magnetic sensor that are provided at the radially inner and outer portions, respectively, in the fifth embodiments are provided at the radially outer and inner portions, respectively, in the sixth embodiment. In FIG. 9, the radially inner portion of the flange member 1 is supported by the support member 2. The support member 2 has at its radially outer portion a tubular portion 7 having a radially inner surface facing the radially outer surface of the flange member 1. The magnetic target 3 is fixed to the radially outer surface of the flange member 1, while the magnetic sensor 4 is fixed to the radially inner surface of the tubular portion 7.

The support member 2 has an annular protrusion 29 at the radially outer portion of the surface of the support member 2 opposite to its surface facing the flange member 1. The annular protrusion 29 supports the support member 2. With this arrangement too, when an axial load is applied to the flange member 1, not only the flange member 1 but also the support member 2 is deflected. Since the magnetic target 3 and the magnetic sensor 4 are moved relative to each other due to deflection of both members 1 and 2, the load applied can be detected with high resolution.

Figure 10:
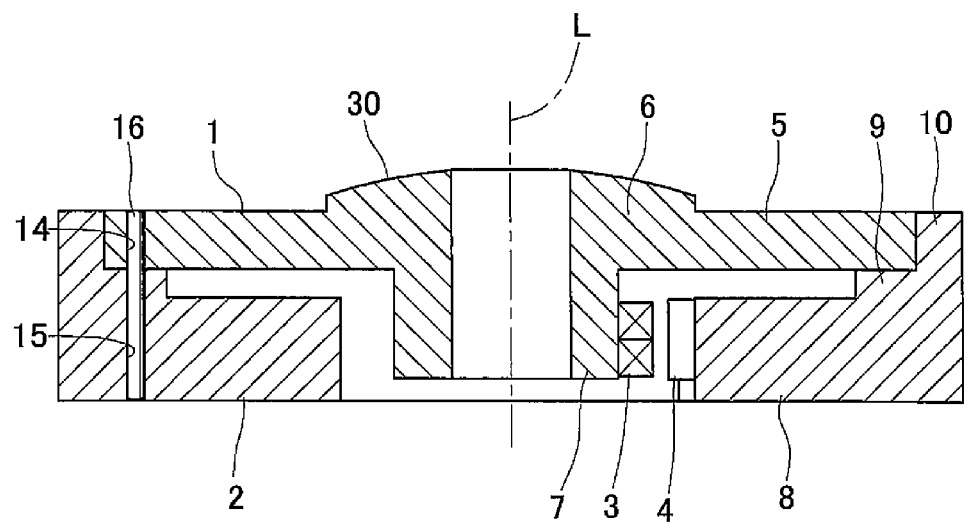
FIG. 10 is a sectional view of a magnetic load sensor unit according to a seventh embodiment of the present invention.

FIG. 10 shows a magnetic load sensor unit according to a seventh embodiment, the load bearing portion 6 of the flange member 1 is formed with a spherical surface 30 of which the center is located on the center axis L of the flange member 1. With this arrangement, if a load oblique to the axial direction is applied, such a load acts on the flange member 1 at a point closer to the center axis L of the flange member 1, which allows the flange member 1 to be deflected more uniformly, and thus stabilizes detection accuracy.

Figure 11:
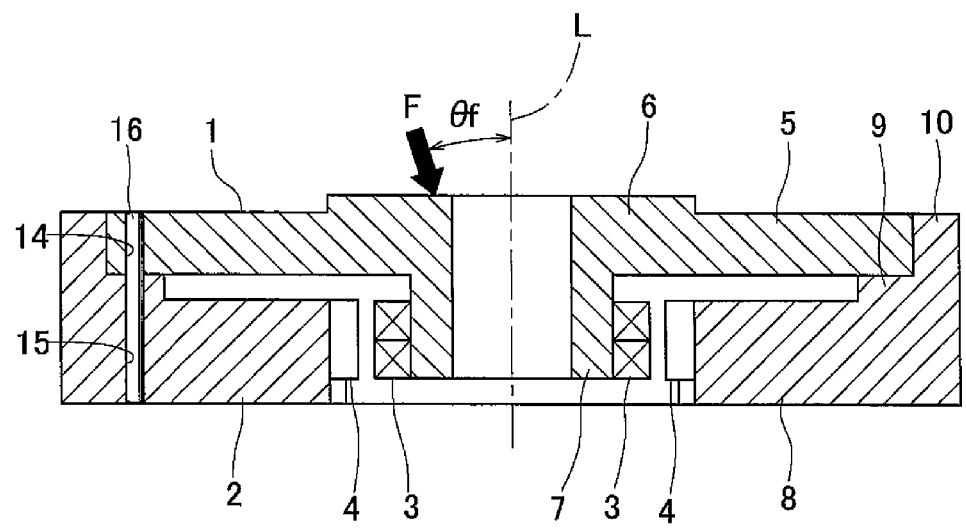
FIG. 11 is a sectional view of a magnetic load sensor unit according to an eighth embodiment of the present invention.
Figure 12:
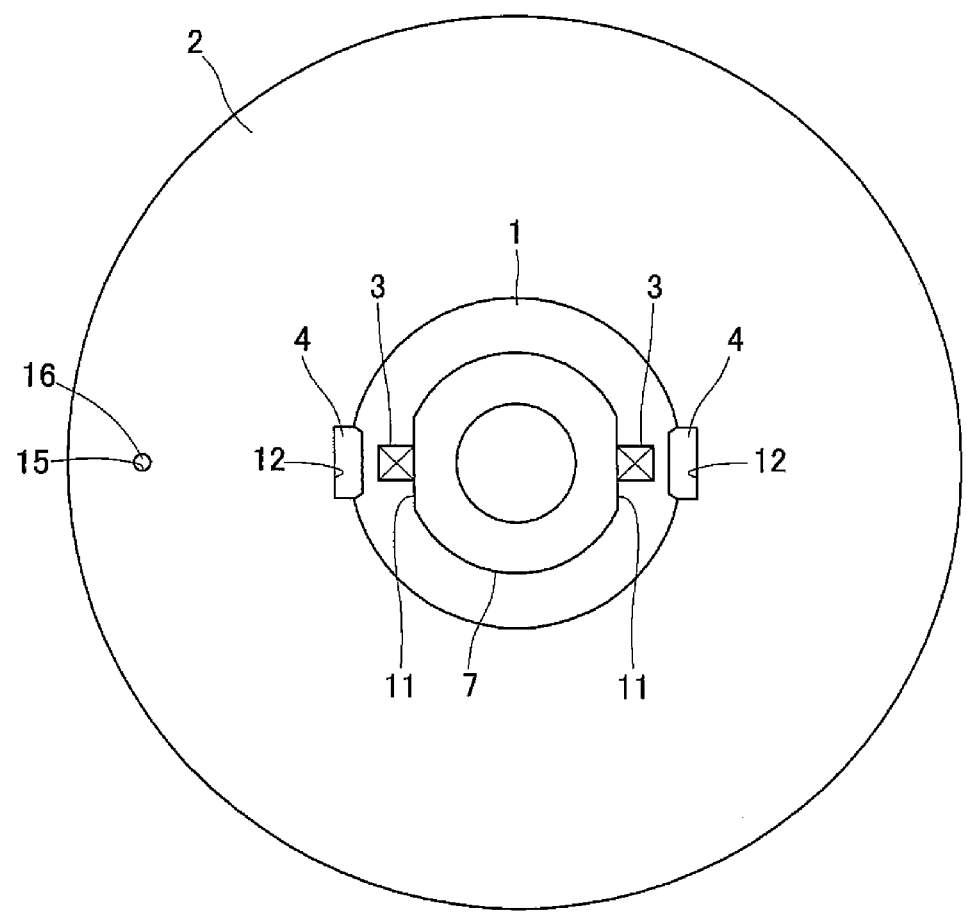
FIG. 12 is a bottom plan view of the magnetic load sensor unit shown in FIG. 11.
Figure 13:
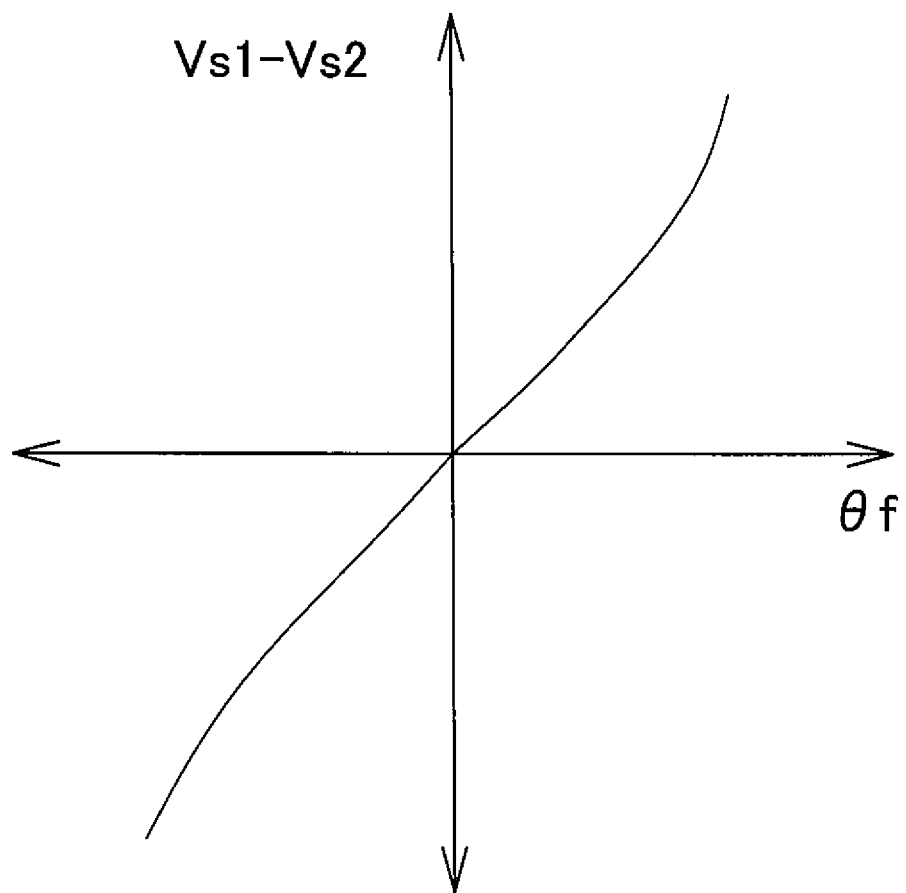
FIG. 13 shows the relationship between a difference between output signals of a plurality of magnetic sensors and the angle of a load applied.

FIGS. 11 and 12 show a magnetic load sensor unit according to an eighth embodiment of the present invention. This magnetic load sensor unit includes a plurality of (two in FIGS. 11 and 12) sets of magnetic targets 3 and magnetic sensors 4, the respective sets lying on a common circle whose center is on the center axis L of the flange member 1 and circumferentially equidistantly spaced apart from each other. With this arrangement, by grasping beforehand the relationship shown in FIG. 13, i.e. the relationship between the difference (Vs1−Vs2) between the output signals of the magnetic sensors 4 of the respective sets and the angle θf of the load F applied relative to the axial direction, it is possible to estimate the angle θf the load F applied based on the difference (Vs1−Vs2). Then, based on the estimated angle θf, it is possible to calculate the axial component of the load F applied.

Figure 14:
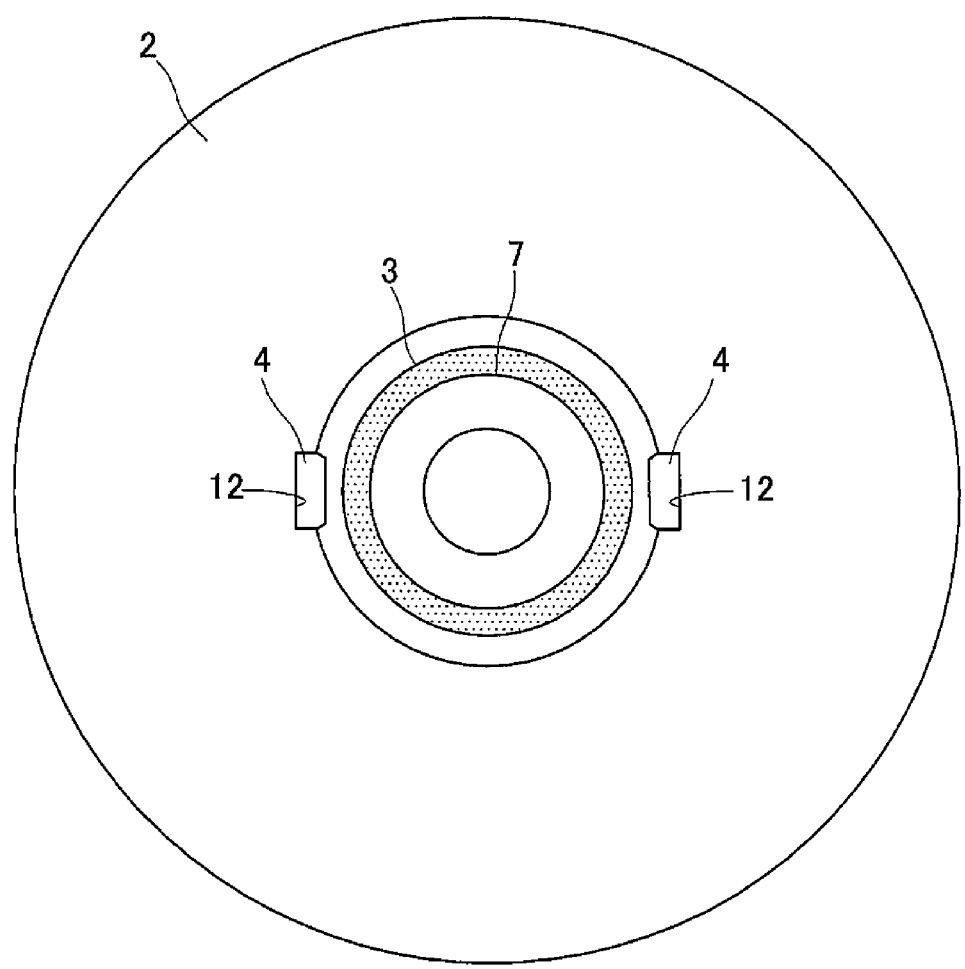
FIG. 14 is a bottom plan view of a magnetic load sensor unit including a magnetic target different from magnetic targets shown in FIG. 12.

Instead of providing a plurality of magnetic targets 3 individually corresponding to the respective magnetic sensors 4 as shown in FIG. 12, a single ring-shaped magnetic target 3 may be provided on the outer periphery of the tubular portion 7 to extend the entire circumference thereof, as shown in FIG. 14. With the latter arrangement, it is possible to eliminate the necessity of adjusting the circumferential relative position between the flange member 1 and the support member 2, which in turn makes it easier to assemble the sensor unit.

Figure 15:
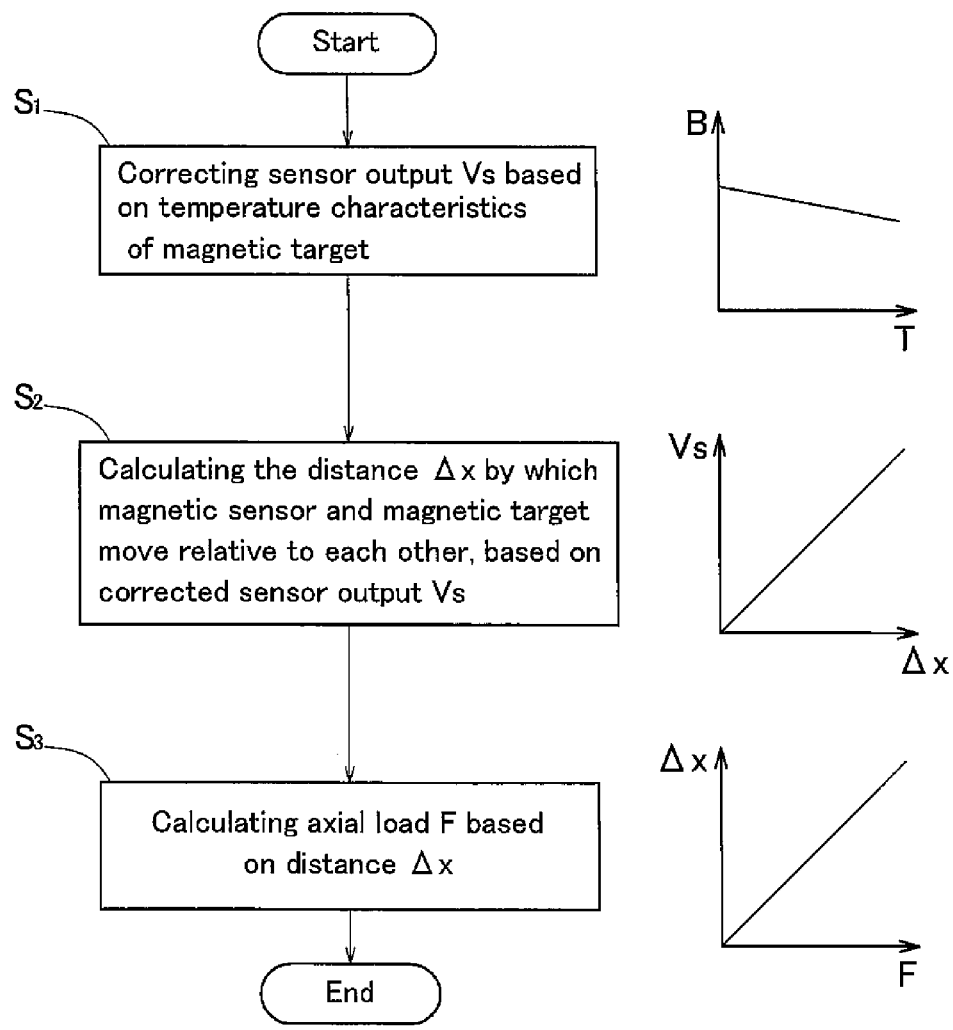
FIG. 15 is a flowchart showing a method of estimating the magnitude of an axial load applied based on the output signal of a magnetic sensor.

FIG. 15 shows a method of estimating the axial load F applied based on the output signal Vs of the magnetic sensor 4. With the relationship between the magnetic field B generated by the permanent magnets 13 and the temperature T grasped beforehand, the output signal Vs of the magnetic sensor 4 is corrected based on the above relationship (Step S1). Then, the relative displacement Δx between the magnetic sensor 4 and the magnetic target 3 is estimated based on the corrected sensor output Vs (Step S2). Finally, the magnitude of the axial load F is calculated based on the relative displacement Δx (Step S3). By compensating for the temperature-dependent magnetic characteristics of the magnetic target 3 in the above manner, it is possible to ultimately estimate the load independently of the temperature conditions. In order to compensate for the temperature influence, a magnetic sensor 4 having a built-in temperature compensation function, such as a Hall IC, may be used to estimate the load applied from the output of such a magnetic sensor 4.

Figure 16:
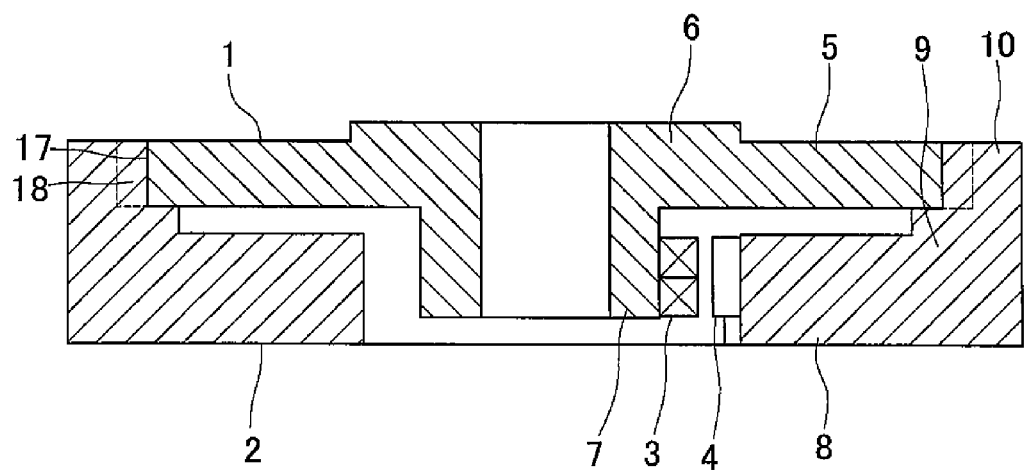
FIG. 16 is a sectional view of a magnetic load sensor unit in which a flange member and a support member are coupled together by keys instead of a positioning pin shown in FIG. 1.
Figure 17:
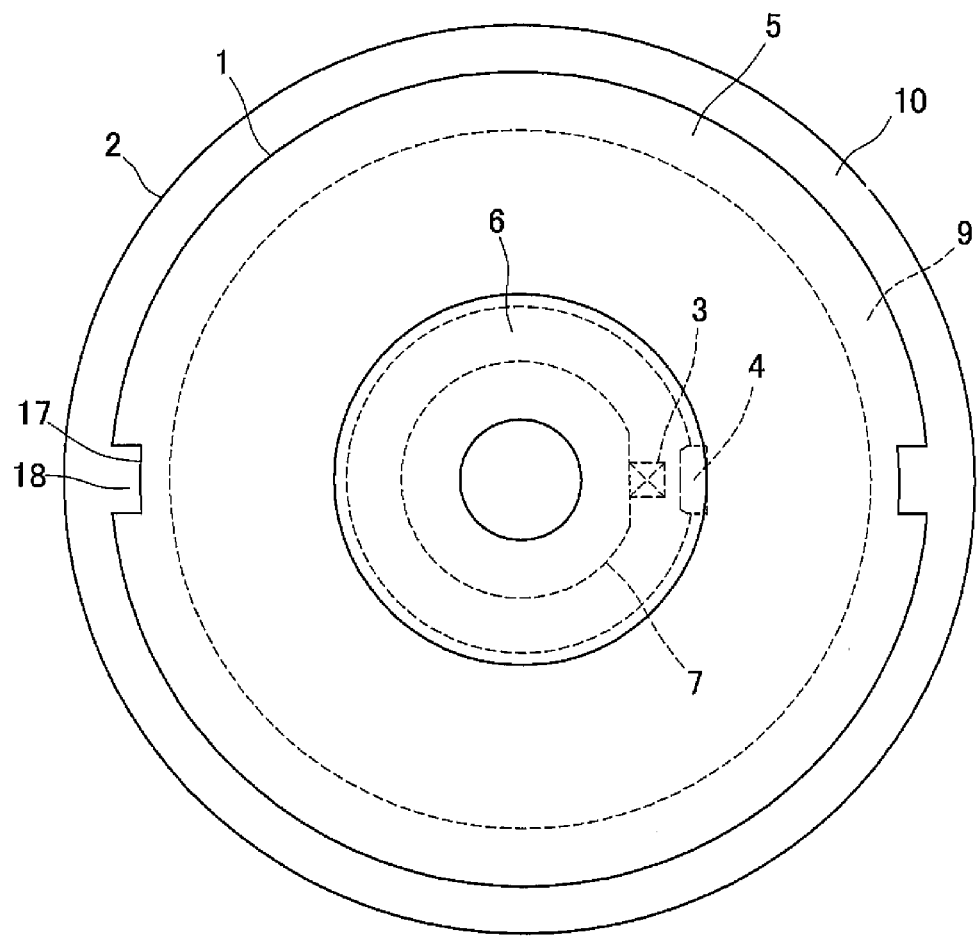
FIG. 17 is a plan view of the magnetic load sensor unit shown in FIG. 16.

In any of the above embodiments, the positioning pin 16 is used to fix the circumferential relative position between the flange member 1 and the support member 2. But instead of the positioning pin 16, the members 1 and 2 may be coupled together by keys as shown in FIGS. 16 and 17. In FIGS. 16 and 17, the flange member 1 is formed with axially extending key grooves 17 in its outer periphery, while the fitting portion 10 of the support member 2 is formed with axially extending key ribs 18 on its inner periphery which are engaged in the respective key grooves 17. The key grooves 17 and the key ribs 18 are arranged such that when the latter are engaged in the former, the circumferential position of the magnetic target 3 coincides with the circumferential position of the magnetic sensor 4. As an alternative to the embodiment of FIGS. 16 and 17, key grooves may be formed in the outer periphery of the flange member 1 and the inner periphery of the fitting portion 10 of the support member 2, and a common key member may be engaged in both of the key grooves. Further alternatively, the flange member 1 and the support member 2 may be coupled together by means of serrations, or by engagement of protrusions and recesses formed on the axially opposed surfaces of the respective members 1 and 2.

Figure 18:
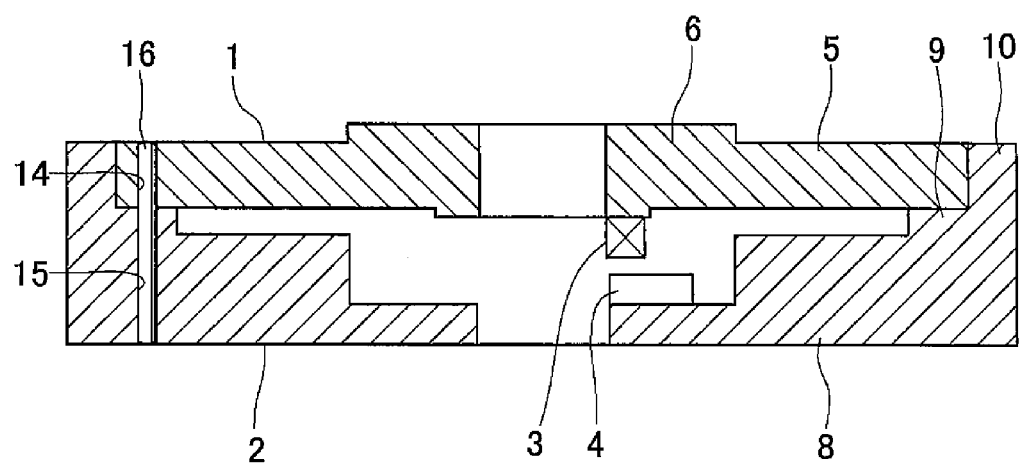
FIG. 18 is a sectional view of an embodiment in which a magnetic target and a magnetic sensor of FIG. 1 are arranged in a different manner.

In any of the above embodiments, in order to accurately detect the distance by which the magnetic target 3 and the magnetic sensor 4 move relative to each other, the magnets of the magnetic target 3 are arranged such that the magnetic target 3 is magnetized in a direction perpendicular to the direction in which the magnetic target 3 and the magnetic sensor 4 move relative to each other. Alternatively, as shown in FIG. 18, the magnetic target 3 may be arranged such that the magnetic target 3 is magnetized in the direction parallel to the direction in which the magnetic target 3 and the magnetic sensor 4 move relative to each other, with the magnetic sensor 4 disposed in the vicinity of the magnetic target 3.

DESCRIPTION OF THE DRAWINGS

1. Flange member
2. Support member

3. Magnetic target
4. Magnetic sensor
7. Tubular portion
13. Permanent magnet
16. Positioning pin
17. Key groove
18. Key rib
29. Annular protrusion
30. Spherical surface
L. Center axis

What is claimed is:

1. A magnetic load sensor unit comprising:
    a flange member configured to be deflected when an axial load is applied;
    a support member supporting the flange member, the support member including a top surface abutting a bottom surface of the flange member;
    at least one magnetic target which generates a magnetic field; and
    at least one magnetic sensor for detecting the magnetic field generated by the at least one magnetic target;
    wherein one of the at least one magnetic target and the at least one magnetic sensor is fixed to one of the flange member and the support member, and the other of the at least one magnetic target and the at least one magnetic sensor is fixed to the other of the flange member and the support member, such that when the flange member is deflected, the at least one magnetic target and the at least one magnetic sensor move relative to each other, whereby a magnitude of the applied axial load is detectable based on the magnetic field as detected by the at least one magnetic sensor.

2. The magnetic load sensor unit of claim 1, wherein the at least one magnetic target comprises at least two permanent magnets each magnetized in a direction perpendicular to a relative movement direction in which the at least one magnetic target and the at least one magnetic sensor move relative to each other, wherein the at least two permanent magnets are arranged such that opposite magnetic poles of the at least two permanent magnets are aligned in the relative movement direction, and wherein the at least one magnetic sensor is located in a vicinity of a boundary between the opposite magnetic poles.

3. The magnetic load sensor unit of claim 2, wherein the flange member and the support member are annular plate members facing each other, wherein the support member supports a radially outer portion of the flange member, wherein one of the flange member and the support member includes a tubular portion having a radially outer surface facing a radially inner surface of the other of the flange member and the support member, and wherein the at least one magnetic target and the at least one magnetic sensor are fixed to one and the other of the radially inner surface and the radially outer surface, respectively.

4. The magnetic load sensor unit of claim 3, wherein the support member has an annular protrusion at a radially inner portion of a surface of the support member opposite from a surface of the support member facing the flange member.

5. The magnetic load sensor unit of claim 2, wherein the flange member and the support member are annular plate members facing each other, wherein the support member supports a radially inner portion of the flange member, wherein one of the flange member and the support member includes a tubular portion having a radially inner surface facing a radially outer surface of the other of the flange member and the support member, and wherein the at least one magnetic target and the at least one magnetic sensor are fixed to one and the other of the radially inner surface and the radially outer surface, respectively.

6. The magnetic load sensor unit of claim 1, wherein the flange member and the support member are annular plate members facing each other, wherein the support member supports a radially outer portion of the flange member, wherein one of the flange member and the support member includes a tubular portion having a radially outer surface facing a radially inner surface of the other of the flange member and the support member, and wherein the at least one magnetic target and the at least one magnetic sensor are fixed to one and the other of the radially inner surface and the radially outer surface, respectively.

7. The magnetic load sensor unit of claim 6, wherein the support member has an annular protrusion at a radially inner portion of a surface of the support member opposite from a surface of the support member facing the flange member.

8. The magnetic load sensor unit of claim 1, wherein the flange member and the support member are annular plate members facing each other, wherein the support member supports a radially inner portion of the flange member, wherein one of the flange member and the support member includes a tubular portion having a radially inner surface facing a radially outer surface of the other of the flange member and the support member, and wherein the at least one magnetic target and the at least one magnetic sensor are fixed to one and the other of the radially inner surface and the radially outer surface, respectively.

9. The magnetic load sensor unit of claim 8, wherein the support member has an annular protrusion at a radially outer portion of a surface of the support member opposite from a surface of the support member facing the flange member.

10. The magnetic load sensor unit of claim 1, further comprising a positioning means for fixing a circumferential relative position between the flange member and the support member.

11. The magnetic load sensor unit of claim 8, wherein the support member has an annular protrusion at a radially outer portion of a surface of the support member opposite from a surface of the support member facing the flange member.

12. The magnetic load sensor unit of claim 1, wherein the flange member has a spherical surface having a center located on a center axis of the flange member, and wherein the magnetic load sensor unit is configured such that the axial load acts on the spherical surface.

13. The magnetic load sensor unit of claim 1, wherein the at least one magnetic target and the at least one magnetic sensor comprise a plurality of sets of magnetic targets and magnetic sensors, and wherein respective sets of the plurality of sets of magnetic targets and magnetic sensors lie on a common circle having a center on a center axis of the flange member so as to be circumferentially equidistantly spaced apart from each other.

14. The magnetic load sensor unit of claim 1, wherein the at least one magnetic sensor comprises a Hall IC.

15. The magnetic load sensor unit of claim 1, wherein the at least one magnetic sensor comprises a magnetic resistance element.

16. The magnetic load sensor unit of claim 1, wherein the at least one magnetic sensor comprises a magnetic impedance element.

17. The magnetic load sensor unit of claim 1, wherein the at least one magnetic target comprises a neodymium magnet.

18. The magnetic load sensor unit of claim 1, wherein the flange member and the support member are made of a common material or materials equal in thermal expansion coefficient.

* * * * *